United States Patent [19]

Giardina

[11] Patent Number: 5,248,228
[45] Date of Patent: Sep. 28, 1993

[54] APPARATUS FOR CONVEYING POWDER

[75] Inventor: John C. Giardina, Roselle Park, N.J.

[73] Assignee: L.A. Dreyfus Company, Edison, N.J.

[21] Appl. No.: 879,148

[22] Filed: Apr. 30, 1992

Related U.S. Application Data

[63] Continuation-in-part of Ser. No. 619,132, Nov. 28, 1990, abandoned.

[51] Int. Cl.⁵ .............................................. B65G 53/48
[52] U.S. Cl. ..................................... 406/56; 406/118; 406/121
[58] Field of Search ................ 406/53, 56, 121, 122, 406/134, 135, 108, 118, 145; 198/550.1, 550.4, 553; 366/318, 64, 279

[56] References Cited

U.S. PATENT DOCUMENTS

| | | | |
|---|---|---|---|
| 984,254 | 2/1911 | Akeley | 406/135 X |
| 1,434,508 | 11/1922 | Shimon | 406/135 X |
| 1,860,127 | 5/1932 | Bernert . | |
| 2,795,463 | 6/1957 | Weller | 406/121 X |
| 4,084,628 | 4/1978 | Schmid . | |
| 4,152,029 | 5/1979 | Cowpertwait . | |
| 4,889,452 | 12/1989 | Heyl | 406/121 X |

FOREIGN PATENT DOCUMENTS

| | | | |
|---|---|---|---|
| 3023356 | 1/1982 | Fed. Rep. of Germany | 406/53 |
| 3331414 | 3/1985 | Fed. Rep. of Germany | 406/122 |
| 573698 | 2/1958 | Italy | 406/53 |
| 267614 | 11/1988 | Japan | 406/121 |
| 2182013 | 5/1987 | United Kingdom | 406/56 |

*Primary Examiner*—David M. Mitchell
*Assistant Examiner*—Andrew C. Pike
*Attorney, Agent, or Firm*—Willian Brinks Olds Hofer Gilson & Lione

[57] ABSTRACT

An apparatus for conveying powder. The apparatus includes a hopper for receiving powder, a mechanical conveyor, a sifter and a ribbon blender. The mechanical conveyor delivers powder from the hopper to the sifter. The ribbon blender, which is situated below the sifter for receiving powder from the sifter, has two or more outlets for discharging powder.

5 Claims, 3 Drawing Sheets

APPARATUS FOR CONVEYING POWDER

This application is a continuation-in-part of application Ser. No. 07/619,132, filed Nov. 28, 1990, now abandoned.

BACKGROUND OF THE INVENTION

The present invention relates to a new and improved apparatus for delivering powder, i.e., finely divided mineral adjuvants.

It has long been a problem in industry to deliver powder effectively from bags or containers to a point in a manufacturing process.

One method to deliver powder has been to use vacuum pipe suction. A vacuum pipe is placed into a container of powder and thereby picks up the powder in the container for delivery. The problem with this system is that the pipe must constantly be moved around in the container due to the bridging and caking of the powder, particularly in humid conditions. Another problem is that the flow through the pipe is very uneven since the powder in the container frequently has voids due to the aforementioned caking and bridging. Another problem is that the pipe picks up not only particles of powder, but also agglomerations of powder that have caked together. Such agglomerates may be very harmful to the manufacturing process to which the powder is being delivered. Finally, the pipe may also pick up foreign materials that might be in the container which can contaminate the manufacturing process.

The conveyance of powder is particularly important for the manufacturing processes that use powder. One such process, for example, is the manufacture of chewing gum base.

In the chewing gum base manufacturing process, the raw materials of the gum base are initially melted and mixed together. Then, the melted mix is blended and passed through a filter to take out any foreign materials or impurities. One filter system that may be used to filter the gum base melt comprises horizontal filter tubes, set up for easy and rapid cleaning, which are cylindrical in shape. The melt from the blender enters the filter cylinders from one end of the filter, then exits the filter on its sides through a cylindrical metal screen. The cylindrical metal screen is enclosed within a cloth sock that provides further filtering of the melt. Such filters are easily assembled and disassembled for cleaning purposes.

The filtered gum melt then falls from the filter into a receptacle and when required, is pumped through a heat exchanger to obtain a viscosity suitable for pelletizing.

After the melt passes through the heat exchanger it proceeds to a pelletizer. The pelletizer forms varying sizes of pellets from the gum melt. These pellets are formed by extruding the gum melt through a commercially available die with multiple openings. As the gum melt is extruded through the die, a knife cuts off the pellets. Various sized pellets can be obtained by varying melt temperature, pressure, and knife speed. High pressure water enters the chamber where the die forming the pellets is located. This high pressure water is typically at a temperature between 45° F. and 70° F. and has a flow of greater than 50 gallons per minute. It is directed to the surface of the die, to sweep the pellets rapidly away from the die.

The water and the newly formed pellets then travel through a pipe for a sufficient time to cool until arriving at the location where the pellets are strained from the pipe and the water is recirculated to the point where the pellets are initially formed. Cold water is added to the recirculated water at that point to maintain the required temperature.

The strained pellets are then dried by typical means known in the art. It is at that point that the pellets may proceed to a tumbler where the powder is mixed with the pellets. The powder is applied to the pellets to prevent adhesion, agglomeration, and the like before the pelleted gum base is eventually used in the production of chewing gum.

After the powder is added to the pellets, the pellets then move on through to a hopper and weigh scale at the end of the process. A typical hopper and weigh scale act to automatically fill boxes with the selected weight of pellets. Such a device contains two gravity loaders—one which operates at a high speed and the other at a low speed. In operation, the high speed loader and low speed loader dispense pellets to rapidly fill the box, and then the low speed loader operates alone to top off the final amount when the box is nearly full.

SUMMARY OF THE INVENTION

Briefly stated, the present invention is an apparatus for conveying powder which includes a hopper, a sifter, a mechanical conveyor and a ribbon blender.

The hopper receives powder from a bag or other container. The mechanical conveyor transports the powder from the hopper to the sifter.

The sifter sifts the powder and discharges the powder to the ribbon blender situated below the sifter. The ribbon blender then discharges the powder from two or more outlets.

Accordingly, an advantage of the present invention is that it permits a constant flow of powder to be discharged from the system.

A further advantage of the present invention is that it prevents contamination of the manufacturing process by sifting out foreign materials and caked powder.

DETAILED DESCRIPTION OF THE PRESENTLY PREFERRED EMBODIMENT

Figure 1:
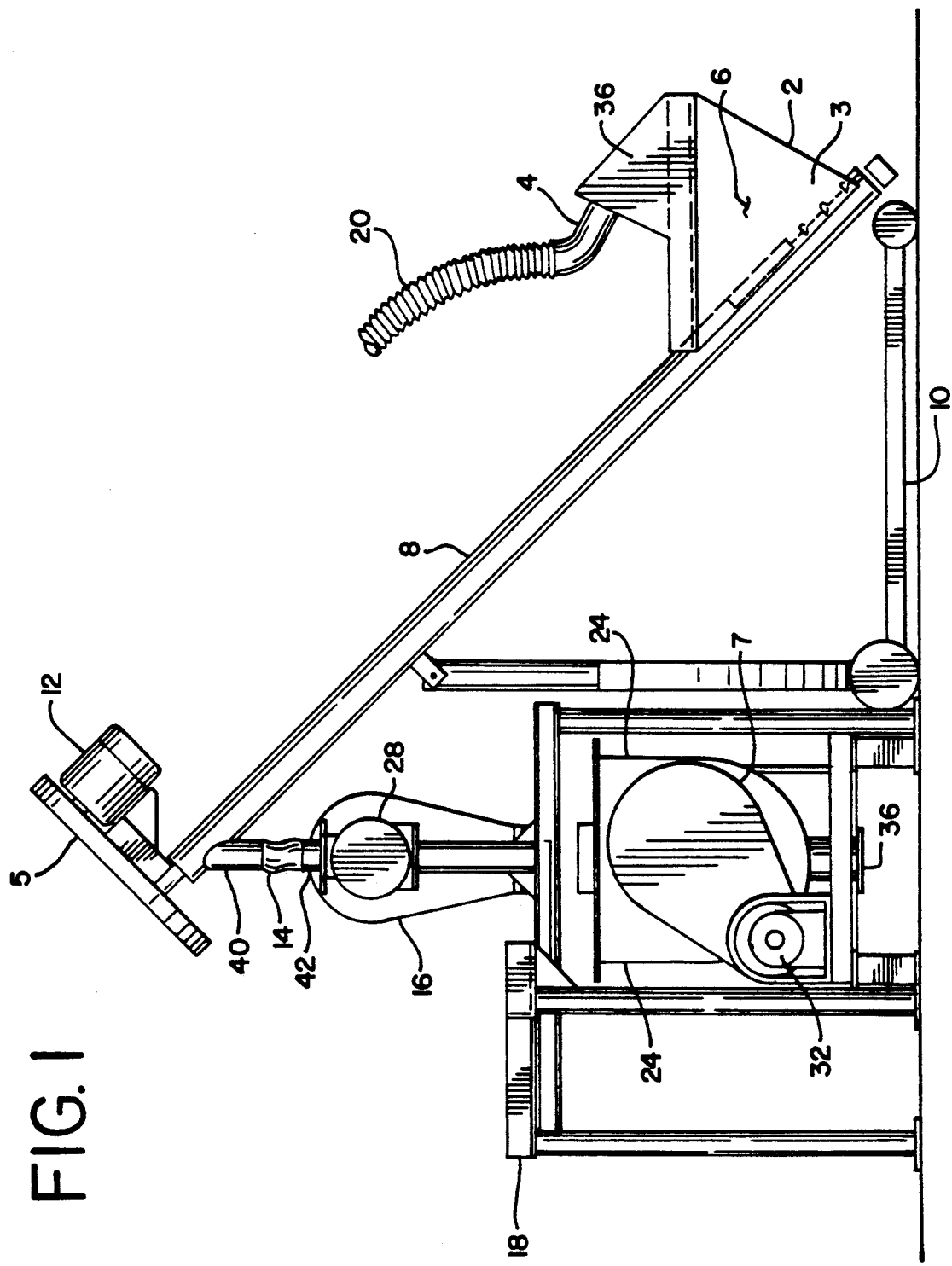
FIG. 1 is a front perspective view of an apparatus for conveying powder in accordance with the present invention.
Figure 2:
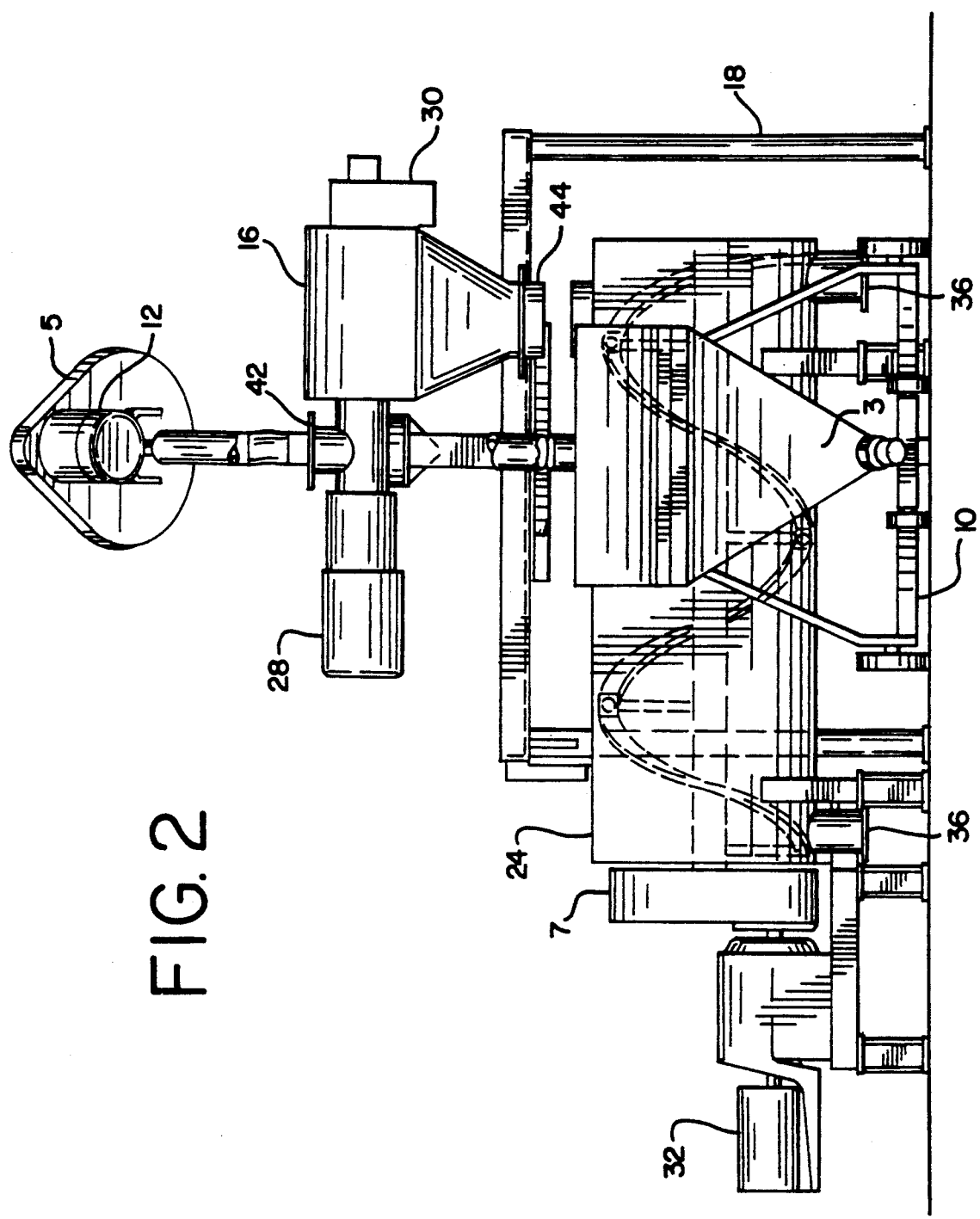
FIG. 2 is a side perspective view of an apparatus for conveying powder in accordance with the present invention.
Figure 3:
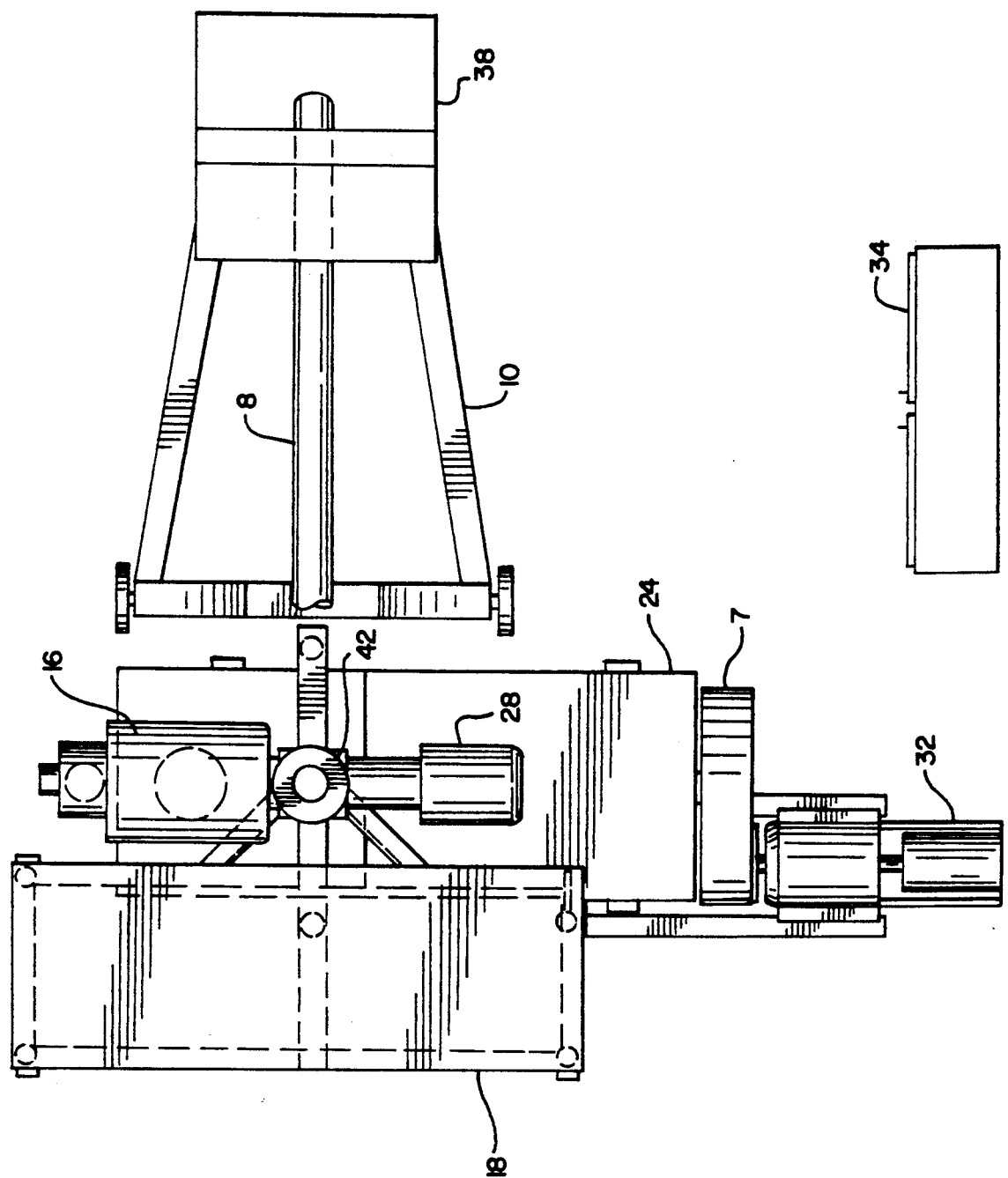
FIG. 3 is a top perspective view of an apparatus for conveying powder in accordance with the present invention.

A preferred embodiment of the present invention is illustrated in FIGS. 1 through 3. The figures shown are not intended as scale reproductions. Also, while the drawings and the description to follow concern a presently preferred embodiment, the present invention is capable of many embodiments so as not to be limited to a preferred embodiment. Finally, the terms upward, downward, horizontal, vertical and similar terms of orientation are intended to represent essentially parallel and/or perpendicular relationships and are not intended to be a limitation on the present invention.

The apparatus for conveying powder includes a hopper 2 (FIG. 1), a mechanical conveyor 8, which acts as a metering as well as conveying device, a sifter 16 and a ribbon blender 24.

Hopper 2 has a bottom 3 that is generally shaped like an inverted pyramid. Hopper 2 has a hood 36 with an outlet 4 that can be connected to a flexible hose 20 which in turn can be attached to a vacuum system for evacuating dust that results from filling hopper 2 with powder.

Hood 36 of bin 2 has a hinged cover 38 (FIG. 3). Hinged cover 38 can be raised to feed powder into bin 2, and it can be lowered when powder is not being fed into bin 2. The cover acts to prevent any inadvertent contamination.

Cover 38 of hood 36 of bin 2 has a window 22 (FIG. 2) that can be used to determine the amount of powder that is in bin 2.

Mechanical conveyor 8 (FIG. 1), such as a screw conveyor, is attached to bin 2. Screw conveyors are commercially available, for example, they may be obtained from Duplex Mill and Manufacturing Co., 415 Sigler Street, Springfield, Ohio 45501. Powder fed into bin 2 is transported from bin 2 via ;mechanical conveyor 8 which is operated by motor 12 and drive assembly 5. One or more vibrating devices 6 assist the powder fed into bin 2 in reaching mechanical conveyor 8 by vibrating the sides of hopper 2 to prevent bridging of the powder. Vibrating devices are commercially available, for example, they may be obtained from Cyclonaire Corp, 2922 North Division, York, Nebr. 78467. When the powder reaches the top of mechanical conveyor 8, the powder discharges out of the outlet 40 of mechanical conveyor 8 at a predetermined efficient rate. The powder then falls through a flexible hose 14 which connects outlet 40 of the mechanical conveyor 8 to the inlet 42 of the sifter 16. Sifters are commercially available, for example, they may be obtained from KEK Inc., 130 Wharton Rd., Bristol, Pa. 19007.

Sifter 16 is driven by a motor 28 (FIG. 2). Sifter 16 has two outlets 44 and 30. Outlet 30 is for foreign matter or caked powder that is sifted from the main powder. This foreign matter is discharged to any type of receptacle. The major powder portion that has been sifted is discharged out outlet 44 of sifter 16.

The powder that is discharged out of outlet 44 of sifter 16 falls into ribbon blender 24. Ribbon blenders are commercially available, for example, they may be obtained from J.H. Day, 4932 Beech Street, Cincinnati, Ohio 45212. Ribbon blender 24 is driven by a motor 32 and drive assembly 7 to maintain the powder in a constant aerated state for reliable vacuum transport. The ribbon blender 24 has at least two discharge outlets 36. The ribbon blender 24 has means that evenly distributes the powder throughout the ribbon blender 24 thereby precluding clogging at the outlets 36. The powder is discharged at either outlet 36, and from this point is taken out by any commercially available vacuum transporting equipment. Such equipment, for example, may be obtained from Vac-U-Max, 37 Rutgers Street, Belleville, N.J. 07109.

Platform 18 (FIG. 3) is used for maintenance of the apparatus.

A control panel 34 (FIG. 3) operates the various components of the apparatus for conveying powder.

Mechanical conveyor 8 and the hopper 2 are mounted on a wheeled platform 10 (FIG. 1). The wheeled platform 10 may be moved relative to sifter 16 and ribbon blender 24 for maintenance and clean up.

I claim:

1. An apparatus for conveying powder comprising:
   a hopper for powder;
   a sifter, said sifter having means for removing contaminants from said powder;
   a mechanical conveyor interposed between said hopper and said sifter for delivering powder from said hopper to said sifter; and
   a ribbon blender;
   said ribbon blender saturated below said sifter to receive powder from said sifter, said ribbon blender agitating the powder to a consistent level of aeration as preparation for vacuum conveying, said ribbon blender having means for evenly distributing the powder throughout the ribbon blender and having two or more outlets for discharge of powder.

2. An apparatus according to claim 1, where said hopper has a hood for the evacuation of airborne powder.

3. An apparatus according to claim 1, wherein a vacuum conveying means further conveys the powder discharged from said two or more outlets of said ribbon blender.

4. An apparatus according to claim 1, wherein said mechanical conveyor comprises a screw conveyor.

5. An apparatus according to claim 1, wherein said hopper has vibrating means to facilitated material flow.

* * * * *

UNITED STATES PATENT AND TRADEMARK OFFICE
CERTIFICATE OF CORRECTION

PATENT NO. : 5,248,228
DATED      : September 28, 1993
INVENTOR(S) :
            John C. Giardina It is certified that error appears in the above-indentified patent and that said Letters Patent is hereby corrected as shown below:

Column 3, line 3, delete ";mechanical" and insert --mechanical--.

Column 4, claim 1, line 29, delete "saturated" and insert --situated--.

Signed and Sealed this

Thirtieth Day of August, 1994

Attest:

Attesting Officer

BRUCE LEHMAN

Commissioner of Patents and Trademarks